United States Patent
Kurby (10) Patent No.: US 9,541,651 B2
(45) Date of Patent: Jan. 10, 2017

(54) TAPERED COHERENT INTEGRATION TIME FOR A RECEIVER OF A POSITIONING SYSTEM

(71) Applicant: iPosi, Inc., Denver, CO (US)

(72) Inventor: Christopher Neil Kurby, Streamwood, IL (US)

(73) Assignee: iPosi, Inc., Denver, CO (US)

( * ) Notice: Subject to any disclaimer, the term of this patent is extended or adjusted under 35 U.S.C. 154(b) by 366 days.

(21) Appl. No.: 14/267,629

(22) Filed: May 1, 2014

(65) Prior Publication Data

US 2015/0316651 A1 Nov. 5, 2015

(51) Int. Cl.
G01S 19/13 (2010.01)
G01S 19/30 (2010.01)
G01S 19/24 (2010.01)
G01S 19/21 (2010.01)

(52) U.S. Cl.
CPC ............. *G01S 19/30* (2013.01); *G01S 19/246* (2013.01); *G01S 19/21* (2013.01)

(58) Field of Classification Search
CPC .......... G01S 19/13; G01S 19/21; G01S 19/30; G01S 19/246
USPC ....................................... 342/357.51, 357.46
See application file for complete search history.

(56) References Cited

U.S. PATENT DOCUMENTS

| 4,387,373 A * | 6/1983 | Longuemare, Jr. . G01S 13/9023 342/149 |
| 6,697,343 B1 * | 2/2004 | Kamel .................. H04L 1/0014 370/278 |
| 8,094,072 B2 | 1/2012 | Pon |
| 2006/0012522 A1 * | 1/2006 | Schmid ..................... G01S 5/12 342/387 |
| 2006/0017615 A1 * | 1/2006 | Schmid ................... G01S 1/045 342/451 |
| 2007/0153882 A1 * | 7/2007 | Eerola ..................... G01S 19/30 375/150 |
| 2008/0112469 A1 | 5/2008 | Goldberg et al. |

FOREIGN PATENT DOCUMENTS

EP 1564564 A2 8/2005

* cited by examiner

*Primary Examiner* — Harry Liu
(74) *Attorney, Agent, or Firm* — Marsh Fischmann & Breyfogle LLP (57) ABSTRACT

Approaches to signal processing using tapered coherent integration time period durations. In this regard, signal processing of received signals (e.g., received satellite navigation signals) may be received at a receiver. The received signals may be processed in a coherent integration process whereby the duration of subsequent coherent integration time periods are reduced in response to errors resulting from frequency instability that grows in time. As such, relatively long durations for coherent integration times may result in improved signal to noise ratios (SNRs) for integrated signals in initial coherent integration time periods. However, as errors that are introduced into the signal processing due grow over time, the durations of subsequent coherent integration time periods may be reduced, thus reducing the effect of the error in a SNR of resulting integrated signals. In turn, receiver sensitivity may be improved.

19 Claims, 4 Drawing Sheets

TAPERED COHERENT INTEGRATION TIME FOR A RECEIVER OF A POSITIONING SYSTEM

FIELD

The present disclosure is generally related to improved approaches for positioning system receiver performance, and in particular to improved performance of high sensitivity receivers for use in a global navigation satellite system (GNSS).

BACKGROUND

Global navigation satellite systems (GNSSs) such as, for example, the Global Positioning System (GPS) or GLONASS, have provided for the ability to locate devices equipped with receivers adapted for receipt of signals from the positioning system. Additional satellite positioning systems have been proposed, or are in development, that include the Galileo system (Europe), the Quasi-Zenith Satellite System (Japan), the Indian Regional Navigational Satellite System (India), and the BeiDou navigation satellite system (China). With the increased prevalence of satellite positioning systems such as those listed above, an increasing number of devices may come equipped with satellite receivers capable of receiving signals transmitted by satellites that may be used to determine the location of a device.

For instance, signals originating from satellites in a satellite positioning system may contain time data and satellite location data. In turn, a receiver that is operable to receive signals from the satellite positioning system can measure the time taken for the signal to reach the receiver from the satellite position. This is often referred to as calculation of a pseudorange. In turn, pseudoranges from multiple satellites may be compared using trilateration to determine the position of the receiver.

In turn, receiver performance may be related to the ability to discern a signal received at the receiver from the positioning system (e.g., from noise or the like). As such, efforts have been made to improve the signal processing capabilities of receivers for processing of signals received at the receiver from the positioning system. Such processing may be made more difficult based on the introduction of errors that may result in a lack of precision of location derived using the signals from the satellite positioning system. That is, introduction of errors into the signals used to derive pseudoranges may degrade the precision of a location that is determined using the signals. Furthermore, receipt of satellite signals may be particularly difficult in certain environments such as, for example, when a receiver is deeply embedded within a building or other structure. Accordingly, approaches to use of GNSS to locate devices located in a building (e.g., a VoIP telephone device or the like) may be hindered given the location of the device to be located. However, it may be important to locate such devices (e.g., in order to provide location based emergency services or the like). Thus, continued efforts related to signal processing of satellite signals received at receivers is needed to develop precise receivers that are efficient and cost effective.

SUMMARY

In view of the foregoing, the present disclosure is related to improved signal processing of signals received at a receiver from a positioning system such as a global navigation satellite system (e.g., GPS or the like). Specifically, the present disclosure provides for improved signal processing that may optimize signal sensitivity. In turn, improved receiver sensitivity may be achieved in view errors that may be introduced into the signal. In turn, the sensitivity of a receiver may be improved to assist in providing a highly precise receiver that is both efficient and cost effective.

Specifically, it has been recognized that when receiving signals from a satellite at a receiver, the receiver may coherently integrate a received signal over a coherent integration time period to improve a resulting signal to noise (SNR) ratio for the integrated signal. This coherent integration may include receiving and/or storing a signal over the coherent integration time period and then integrating the received/stored signals during the coherent integration time period to generate a coherent integration value related to the signals received during the coherent integration time period. This coherent integration value may correspond to the magnitude of the integrated signal over the coherent integration time period. In turn, coherent integration values from a plurality of coherent integration times may then be combined in a non-coherent integration process. In turn, the non-coherent integration may result in an output with an improved SNR. Accordingly, the improved SNR may allow for improved detection of a signal from a satellite.

In theory, as the duration of the coherent integration time period increases the resulting SNR of the integrated signal also linearly increases because the signal adds coherently, or in phase. That is, the magnitude of the signals add coherently effectively causing the signal power to increase as the square of the signal while the noise in the signal adds non-coherently or not in phase effectively causing the noise power to add linearly. Thus, a higher resulting SNR would theoretically be achieved, thus improving the sensitivity of the receiver. In this regard, the coherent integration time period is preferably maximized to achieve as large an SNR as possible. However, frequency instability in the form of frequency errors may result in degradation of the SNR resulting from the phase rotation during the coherent integration period causing the signal to become more non coherent than coherent. Thus, while in an idealized system free from frequency error, there is no theoretical limit on the length on the coherent integration time, real systems are known to suffer from frequency instability resulting from a number of factors.

For instance, unaccounted for Doppler shift in the signal due to satellite motion may impart frequency error in the signal. Some systems attempt to account for such unaccounted for Doppler shift by predicting a Doppler shift of a satellite, however such predictions are not perfect. Moreover, errors in such predictions increase over time due to imprecise satellite and receiver locations resulting from growing errors in the predicted unaccounted for Doppler shift.

Additionally, local oscillator errors may introduce error into the signal. Specifically, the local oscillator at a receiver may drift over time due to random frequency fluctuations commonly referred to as the Allan variance of the oscillator. As such, the drift of the local oscillator may grow over time such that the error introduced by virtue of the drift of the local oscillator may also grow. High stability oscillators may be used to reduce the error imparted due to local oscillator errors, however such high stability oscillators may become prohibitively expensive.

In turn, the present disclosure contemplates reduction in the duration for coherent integration time periods over time for processing signals from a positioning system that are received at a receiver. In this regard, a first, relatively long duration may be used in a first coherent integration time period where the error introduced in the signal (e.g., from one or more sources as described above) has yet to grow suitably large to adversely detrimentally affect the SNR for the relatively long coherent integration time period duration. For instance, the duration for this first coherent integration time period may be set to a maximum duration. However, because an error may increase over time, a duration of a second coherent integration time period subsequent to the first coherent integration time period may be reduced such that the SNR is maximized without ill effects of the increased error. The process may continue such that the durations of subsequent coherent integration time period may further be reduced as the error continues to grow over time.

In this regard, the receiver performance may benefit from a relatively long duration of one or more coherent integration times at a time where the error introduced into the signals is relatively low. However, as the error continues to increase over time, subsequent coherent integration time periods may have shorter durations. In this regard, as the error begins to adversely affect the resulting integrated signal, the duration is shortened to reduce the effects of the errors on the resulting SNR of the integrated signal. As such, the receiver benefits from relatively long duration coherent integration time periods when the error is low to improve the SNR of the resulting signal, but may reduce the effects to the SNR of the signal introduced by errors as the error grows by reducing the duration of subsequent coherent integration time periods.

In this regard, a first aspect includes a method for improved performance of a receiver used in conjunction with a positioning system. The method may include setting a first duration for a first coherent integration time period for coherent integration of signals received from the positioning system at the receiver during the first coherent integration time period. The method further includes modifying the first duration of the coherent integration time period to a second duration for a second coherent integration time period for coherent integration of signals received from the positioning system at the receiver during the second coherent integration time period. In this regard, the second coherent integration time period may be subsequent to the first coherent integration time period. Specifically, the modifying may be in response to errors in the signals introduced at the receiver. The sources of errors that are introduced at the receiver may result from errors at a space vehicle, at the receiver itself, or based on the propagation of the signal from the space vehicle to the receiver. The second duration is less than the first duration. Accordingly, as described above, the second coherent integration time period may result in a higher SNR for the signal given the errors in the signal.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the modifying may occur when use of the second duration results in an improved signal to noise ratio for integrated signals in the second coherent integration time period as compared to a signal to noise ratio for integrated signals in the first coherent integration time period using the first duration. As such, SNR values may be monitored for a number of duration values and the duration producing the highest SNR may be utilized. Also, predetermined times for reducing the duration may be established (e.g., based on a known or estimated error value). In an embodiment, the modification may be determined at least partially based on a local oscillator error. The modifying may at least partially be based on a statistically derived characterization of the error at the receiver. Thus, the value of the error may be known or estimated, but the magnitude of the error may not be known. In this regard, an exact error may be unknown. The statistically derived characterization of the error may correspond with a local oscillator error (e.g., an Allen variance).

In an embodiment, the modifying may include a step-wise reduction in the first duration to the second duration. Alternatively, the modifying may include a continuous reduction in the first duration to the second duration over time. In either regard, the modifying may be repeated to reduce a previous duration of a previous coherent integration time period to a reduced duration for a subsequent coherent integration time period for coherent integration of signals received from the positioning system at the receiver during the subsequent coherent integration time period. The modifying may again in response to errors in the signals introduced at the receiver, and the reduced duration may be less than the previous duration. That is, the method may be repeated a plurality of times to reduce the duration of a subsequent coherent integration time period a plurality of times. Accordingly, the method may include repeating the modifying until the reduced duration is at a predefined minimum duration.

In an embodiment, the method further includes generating a first coherent integration value from coherent integration of signals received from the positioning system at the receiver during the first coherent integration time period and a second coherent integration value from coherent integration of signals received from the positioning system at the receiver during the second coherent integration time period. That is, the received signals may undergo non-coherent integration over a plurality of coherent integration time periods. In turn, the method may also include non-coherently summing the first and second coherent integration values. Each respective coherent integration value may be based on the magnitude of the integrated signals in each corresponding coherent integration time period. Each respective coherent integration value may, in an embodiment, correspond to the squared magnitude of the integrated signals in each corresponding coherent integration time period. Each coherent integration time period for which a corresponding coherent integration value is non-coherently summed may collectively define a non-coherent integration time period. Thus, the method may include resetting a duration for a coherent integration time period in a subsequent non-coherent integration time period to the first duration. As such, the first duration corresponds to a maximum predefined coherent integration time.

In an embodiment, the setting and modifying may be performed locally at the receiver at which the signals are received. Additionally or alternatively, the setting and modifying may be performed remotely from the receiver at which the signals are received. As such, the method may be performed locally at the receiver and/or portions of the method may be performed remotely from the receiver.

A second aspect includes a receiver for use in conjunction with a positioning system. The receiver may include a receiver module operable to receive signals from the positioning system. The system may further include a coherent integration module in operative communication with the receiver module for coherent integration of the signals received by the receiver module. The coherent integration module may be operable to perform coherent integration of the signals received from the receiver module during a corresponding coherent integration time period defined by a duration to generate a coherent integration value for each corresponding coherent integration time period. The system may include a duration determination module in operative communication with the coherent integration module that is operable to establish the duration of a given coherent integration time period. The duration may be established by the duration determination module is at least partially based on errors in the signals introduced at the receiver.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, in an embodiment, the duration determination module may be operable to reduce a previous duration of a previous coherent integration time period to a reduced duration for a subsequent coherent integration time period at least partially in response to errors introduced at the receiver. The duration determination module may set the reduced duration in response to the reduced duration resulting in an improved signal to noise ratio as compared to the signal to noise ratio for the previous duration. The errors introduced at the receiver may at least include an error value corresponding to the local oscillator of the receiver. Accordingly, the duration determination module may be operable to establish the duration at least partially based on a statistically derived characterization of the local oscillator error. Specifically, an exact local oscillator error is unknown. In an embodiment, the positioning system comprises a global navigation satellite system.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
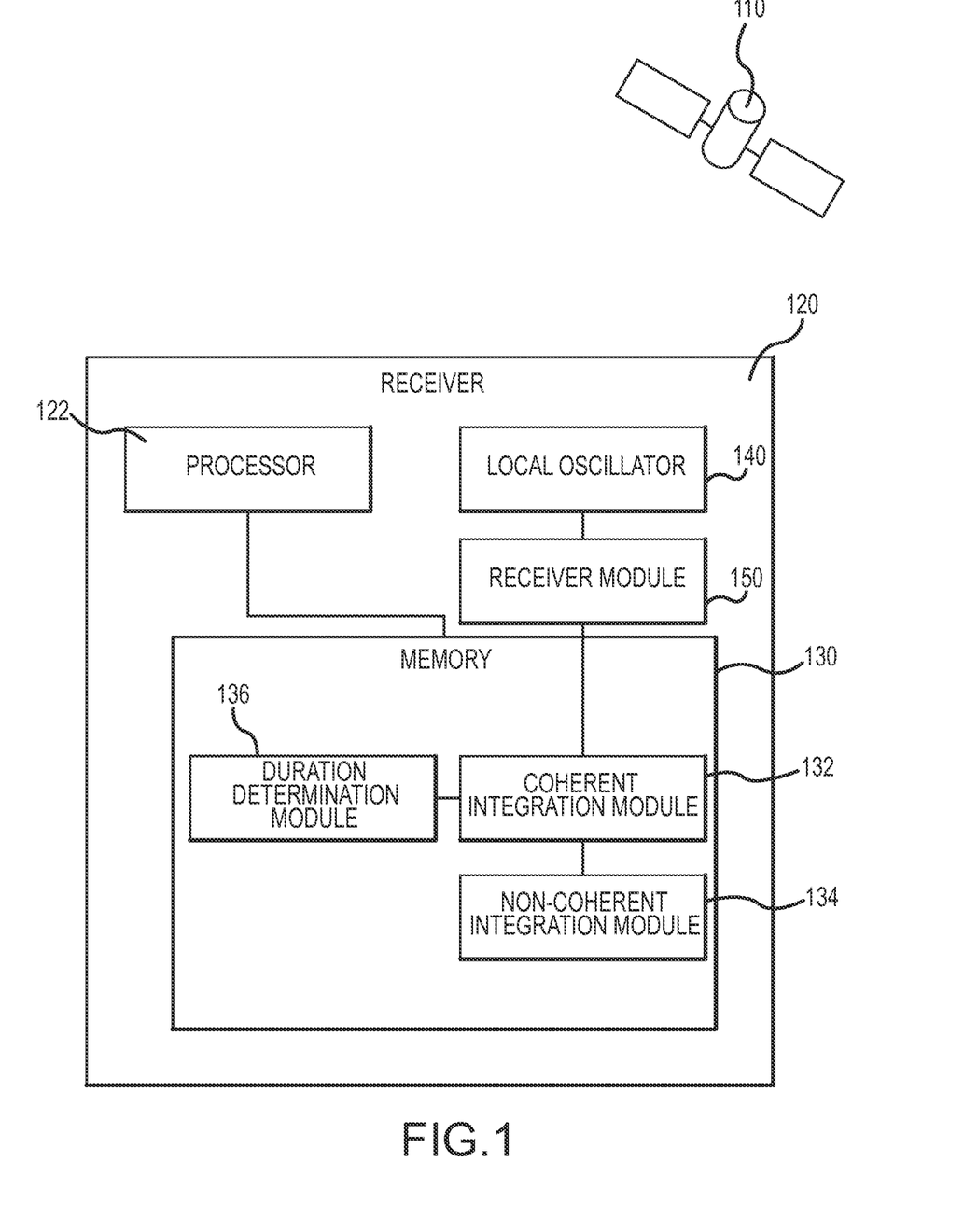
FIG. 1 is a schematic view of a system including a receiver for receiving satellite signals.

With reference to FIG. 1, an embodiment of a system 100 is depicted that may be operable to receive and process satellite signals. The system 100 may be utilized for improved receiver performance as will be appreciated with further reference to the disclosure contained below. The system 100 may include a receiver 120 that may receive signals from one or more satellites 110 (e.g., navigational satellites or the like). As may be appreciated, the receiver 120 may be a standalone unit used for acquiring satellite signals and/or resolving location information from the signal. The receiver 120 may also be incorporated into a device such as, for example, a communications device such as a mobile device, VoIP telephone device, or the like.

In any regard, the receiver 120 may include a processor 122 in operative communication with a memory 130. The processor 122 may be a microprocessor that is operative to access non-transitory machine readable data stored in the memory 130. In this regard, the machine readable code may include instructions readable by the processor 120 to facilitate control of the operation of the receiver 120 as generally discussed herein. In this regard, the processor 122 may comprise one or more general purpose microprocessors that may be specifically configured to operate in the manner discussed herein based on the non-transitory computer readable data stored in the memory 130. Additionally or alternatively, the processor 122 may comprise or include application specific integrated circuits (ASICs), programmable field gate arrays, or other processor types known in the art.

A number of modules are discussed herein as residing in memory 130 (e.g., comprising non-transitory machine readable data executable by processor 122), however it may be appreciated that such modules may comprise software and/or hardware capable of performing in the manner described with respect to each respective module. Furthermore, while such modules are discussed individually for purposes of explanation herein, it may also be appreciated that certain modules may be executed and/or configured such that multiple modules as discussed herein may be integrated. Furthermore, the operations of the modules discussed herein could also be divided differently or among different modules without limitation.

The receiver 120 may also include a receiver module 150. The receiver module 150 may include hardware (e.g., an antenna or the like) and/or software configured to receive radio frequency signals from one or more source. Specifically, the receiver module 150 may receive transmitted signals from a satellite 110 or the like. The receiver module 150 may be operable to provide the received signals to a coherent integration module 132. The coherent integration module may be operable to process the received signals in a manner that will be discussed in greater detail below.

The receiver may also include a local oscillator 140. The local oscillator 140 may be in operative communication with the receiver module 122. The local oscillator 140 may facilitate functionality related to a clock function of the receiver module 122. That is, the local oscillator 140 may provide a clock signal used in the operation of the receiver module 122. In turn, the local oscillator 140 may affect a time measure maintained at the receiver 120. The processor 150 may also utilize a local oscillator to operate, which may or may not be the same as the local oscillator 130 in operative communication with the receiver module 122.

In the context of a GPS receiver, the time measure of the receiver 120 may affect the overall accuracy and/or precision of a pseudorange calculated at the receiver 120 based on signals received from a satellite 110. That is, because the calculation of a pseudorange may involve calculations of distance based on a time reference and location data transmitted by the satellite in relation to a time measure maintained at the receiver 120, inaccuracies in the time measure at the receiver 120 may lead to a reduction in accuracy and/or precision of the resulting pseudorange calculated using the time measure of the receiver. For example, a receiver may use signals received from a plurality of satellites to determine the difference of the time reference contained in the signal and the time measure at the receiver to compute a distance (i.e., the pseudorange) to each satellite using the speed of light. Each pseudorange may define a sphere relative to the location data provided by the satellite. Trilateration may be used to determine the intersection of the spheres defined by the satellite locations and pseudoranges using the navigation equations known in the art. Thus, in the trilateration process that is performed in relation to a plurality of pseudoranges, the resulting precision of a location determined in the triangulation process may be reduced in view of errors in the time measure maintained at the receiver 120.

In prior approaches utilized by GPS receivers, such potential for errors based on errors in the time measure maintained at a receiver may be reduced by way of acquiring four or more signals from different satellites in a common epoch. As may be appreciated, four pseudoranges calculated from four received signals may be sufficient to provide a determined location by way of trilateration. In this regard, use of four simultaneous pseudoranges may allow for correction of any inaccuracies in the time measure maintained at the receiver by providing a determined system (e.g., four inputs for four variables in the form of x position, y position, z position, and time). As the four sphere surfaces typically do not intersect (e.g., due to time measure errors), solving for a time error using the four pseudoranges may allow for correction of the time measure at the receiver. This may allow for less precise oscillators to be employed in receivers as the time measure of the receiver may be corrected upon acquisition of signals from at least four satellites.

However, in certain situations, the ability to obtain signals from four or more satellites in a common epoch may be limited. For instance, the ability to receive signals from satellites may be limited based on is less than optimal geometry, where multi-path signal distortion is present, or in cases where dominant GNSS signal jamming masks weaker signals. These scenarios may commonly occur in the case of in-building located GPS devices. One such example of these devices may be GPS equipped IP or VoIP devices. A number of approaches for improving signal acquisition for in-building GPS devices such as VoIP devices have been proposed including those described in U.S. Pat. No. 7,961,717, the entirety of which is incorporated herein by reference.

In this regard, it may be appreciated that a greater ability to discern a signal from a satellite 110 at a receiver 120 may help improve the precision of the receiver because additional satellite signals may be received even in the case there the signal may be weak (e.g., as may be the case of an in-building receiver). However, it will also be appreciated that the approaches to signal processing described herein may be utilized to improve acquisition of satellite signals in the case of weak signals, high amount of noise or interference, or other scenarios involving difficulty in resolving a signal. As such, the approaches described herein may allow for more rapid signal acquisition and/or recognition in addition to the potential for allowing weaker signals to be recognized.

The receiver 120 may include a coherent integration module 132 that may be operable to coherently integrate the signals received from the receiver module 150 to determine a coherent integration value. The coherent integration module 132 may integrate a signal received from the receiver module 150 over a duration corresponding to a coherent integration time period. In this regard, a coherent integration time period may correspond to a period of time over which signals received during the period are integrated coherently to generate a coherent integration value. Thus, in a low error environment, the longer the duration of the coherent integration time period is, the higher the resulting signal to noise ratio (SNR) of the coherent integration value representative of the signal received from the receiver module 150. In turn, a greater sensitivity may be achieved for a fixed amount of total time.

However, it has been found that there are practical limits on the duration of the coherent integration time period that may be used for coherent integration. Specifically, the duration of the coherent integration time period is given by the amount of time the frequency of the signal is stable. Accordingly, in the absence of frequency error and assuming continual satellite visibility, there is no theoretical limit on the duration of the duration of a coherent integration time period. However, several factors have been identified for real dynamic systems such as GPS receivers that limit the practical duration of the coherent integration time period.

One such limit may be unaccounted for Doppler shift present in the signal due to satellite motion. In this regard, system designers attempt to account for Doppler change by predicting the Doppler shift per satellite. However, this prediction will not be perfect. Furthermore, the error in Doppler prediction will increase with time due to imprecise satellite and GPS receiver locations. Additionally, it may be appreciated that the local oscillator 140 may be a source for errors introduced into the signal during the coherent integration time period. As may be appreciated, the local oscillator 140 frequency will drift over time due to random frequency fluctuations (commonly referred to as the Allan variance on an oscillator) and/or temperature fluctuations. The drift (i.e., error) in the local oscillator 140 also increases as time passes, such that the error increases with time.

One approach to limiting the errors introduced during a coherent integration time period is to utilize higher stability oscillators (e.g., as measured by Allan variance). In this regard, as the precision of the oscillator increases, the longer the coherent integration time period may be. However, very high stability oscillators have an extreme cost penalty. Accordingly, the use of high stability oscillators may be infeasible given the resulting high cost of the receiver.

Accordingly, the present disclosure provides an improved approach that allows for the duration of the coherent integration time period to be optimized to provide increase performance of the receiver. In this regard, a duration determination module 136 may be provided that may be operative to establish the duration of a plurality of coherent integration time periods at the receiver 110. The operation of the duration module 136 is discussed in greater detail below, but generally it has been recognized that the duration of a coherent integration time period may be initially set to a maximum duration. In turn, as time passes, the duration of subsequent coherent integration time periods may be reduced in response to errors being introduced into the signal (e.g., based on the foregoing factors discussed where errors increase with time). As such, the resulting signal processing that occurs during the coherent integration process may benefit from relatively long durations early in a cycle where the errors are relatively low and as errors begin to grow with the passage of time, the duration of the coherent integration times may be reduced to reduce the detrimental effect that results from the errors introduced at the local oscillator 140.

Figure 2:
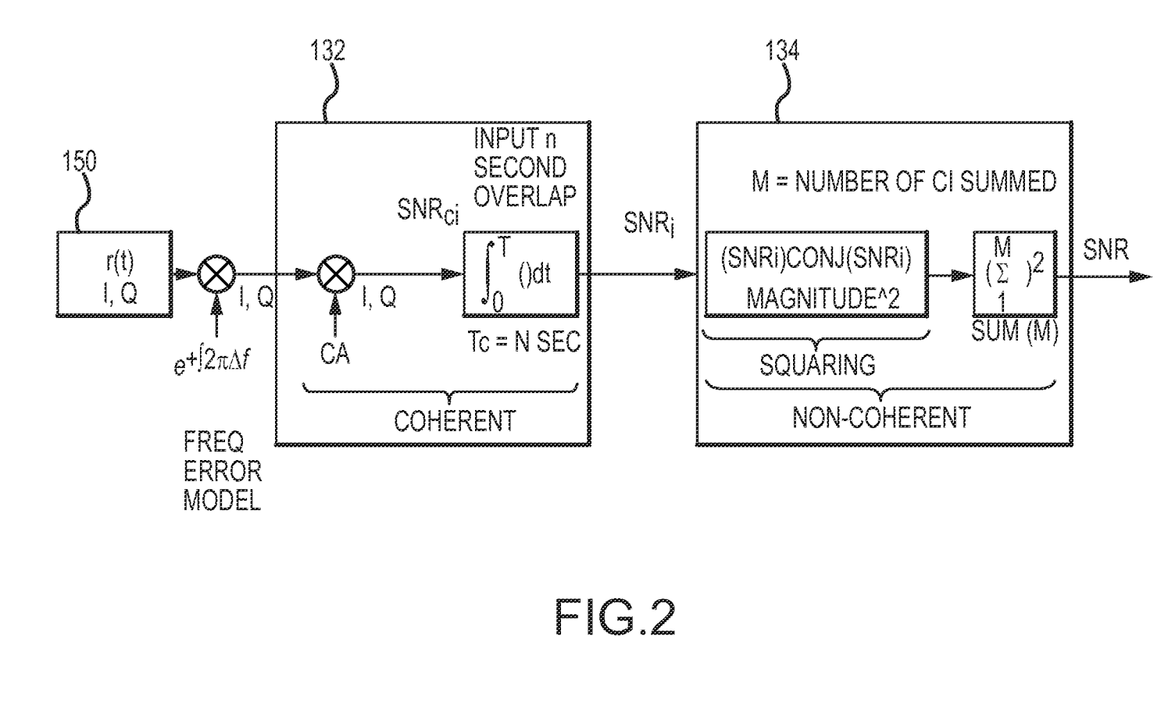
FIG. 2 is a schematic view of a coherent and non-coherent integration module for use in signal processing.

With reference to FIG. 2, an embodiment of signal processing of the kind discussed generally above is represented schematically. In this regard, the coherent integration module 132 may receive signal inputs from the receiver module 150. The coherent integration module 132 may coherently integrate the signals over a duration of a coherent integration time period. A resulting coherent integration value may be provided to a non-coherent integration module 134. In this regard, a plurality of coherent integration values for a corresponding plurality of coherent integration time periods may be provided to the non-coherent integration module 134. The non-coherent integration module 134 may, in turn, non-coherently integrate the coherent integration value for a plurality of coherent integration time periods that collectively define a non-coherent integration time period. With further regard to FIGS. 3A-3B, coherent integration time periods and non-coherent integration time periods are graphically illustrated where the horizontal axis represents time.

Figure 3A:
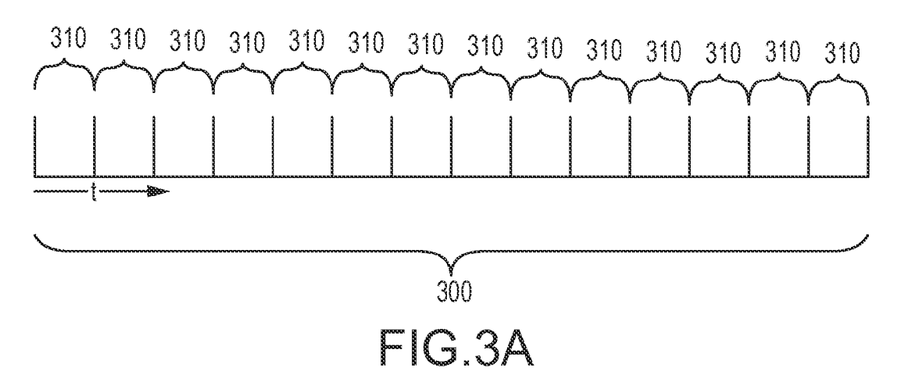
FIGS. 3A-3C depict various coherent and non-coherent integration time periods as represented along a horizontal time axis.

In FIG. 3A, a non-coherent integration time period 300 is depicted that comprises a plurality of coherent integration time periods 310 of equal length. In this regard, with returned reference to FIG. 2, signals received during each coherent integration time period 310 may be inputted into the coherent integration module 132 and coherently integrated over the duration of each coherent integration period 310. As such, a coherent integration value may be generated for each coherent integration time period 310 that is in turn inputted into the non-coherent integration module 134. The non-coherent integration module 134 may then non-coherently integrate each coherent integration value for each respective coherent integration time period 310 over the non-coherent integration time period 300.

The limit on the duration of a coherent integration time period may be due to frequency error that causes a loss in the recovered SNR due to phase rotation causing the signal to become less coherent, less phase aligned, and creating loss. The loss (L) per coherent time period (k) may be calculated by:

$$L(k) = \left(\frac{\sin(f_{err}\pi\tau_{ci})}{f_{err}\pi\tau_{ci}}\right)^2 \quad \text{Equation 1}$$

In this regard, the resulting SNR value ($SNR_i$) after coherent integration accounting for the coherent integration frequency loss may be determined as:

$$SNR_i = (T_{ci}SNR_{ci}L(k)) \quad \text{Equation 2}$$

where $T_{ci}$ is the duration of the coherent integration period and $SNR_{ci}$ represents the SNR value input into the coherent integration module 132. In turn, a recovered SNR value ($SNR_o$) may be generated by way of non-coherent integration in the non-coherent integration module 134 using the equation:

$$SNR_o = \frac{M(SNR_i)^2}{4 + 4SNR_i} \quad \text{Equation 3}$$

where M is equal to the number of coherent integration values (i.e., the number of coherent integration time periods 310 in the non-coherent integration time period 300). From equation 3 it may be appreciated that $SNR_o$ does not increase linearly with $SNR_i$ due to the extra term in the denominator for low to moderate levels of SNR, which is where sensitivity is defined.

Figure 3B:
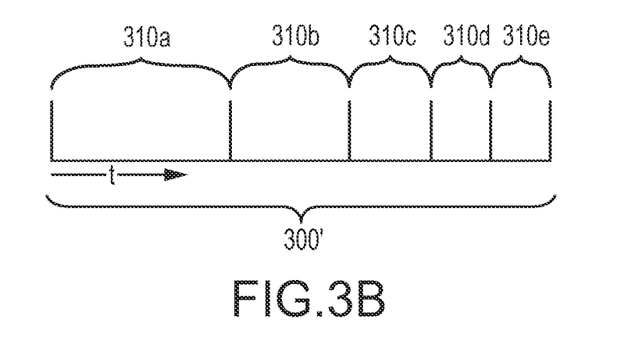

Accordingly, with further regard to FIG. 3B, a depiction of a non-coherent integration period 300' is shown with coherent integration time periods 310a, 310b, 310c, and 310d. As may be appreciated, the duration of coherent integration time period 310b may be less than the duration of coherent integration time period 310a. As such, the duration of a subsequent coherent integration time period 310b may be reduced compared to a prior coherent integration time period 310a during a non-coherent integration time period 300' in response to the introduction of errors (e.g., frequency errors) that may grove over the duration of the non-coherent integration time period.

Figure 3C:
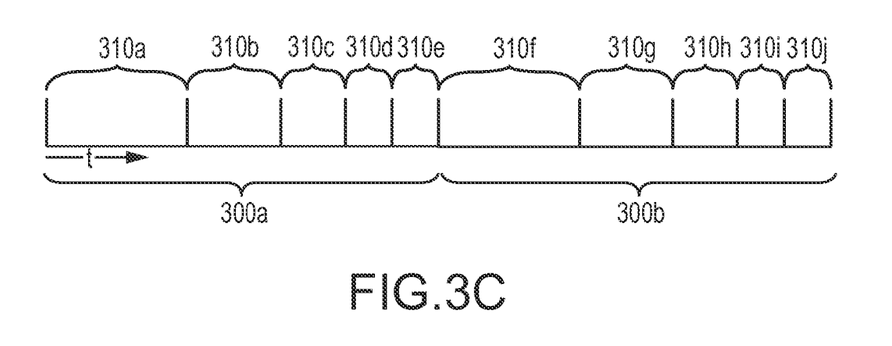

With further reference to FIG. 3C, it may be appreciated that the foregoing process of coherent integration and non-coherent integration may be repeated over a plurality of non-coherent integration time periods (e.g., a first non-coherent integration time period 300a and a second non-coherent integration time period 300b). As such, at the initiation of the second non-coherent integration time period 300b, the duration of the first coherent integration time period 310f in the second non-coherent integration time period 300b may be reset to a maximum duration. In turn, the reduction of the duration of subsequent coherent integration time periods 310g, 310h, 310i, and 310j may repeat in the second non-coherent integration time period 300b.

As described above, the duration determination module 136 may be in operative communication with the coherent integration module 132 and operative to establish the duration of a coherent integration time period in accord with the foregoing discussion. As may be appreciated, the duration of each coherent integration time period is optimally maximized for each coherent integration period based on the constraint that with increasing errors, the resulting SNR of the integrated signal will eventually degrade if the duration is too large. That is, as the error introduced into the signal increases, the SNR of the integrated signal eventually undergoes less gain than would the resulting SNR for coherent integration utilizing a shorter duration of the duration of a coherent integration time period. This concept is illustrated graphically in FIG. 4.

Figure 4:
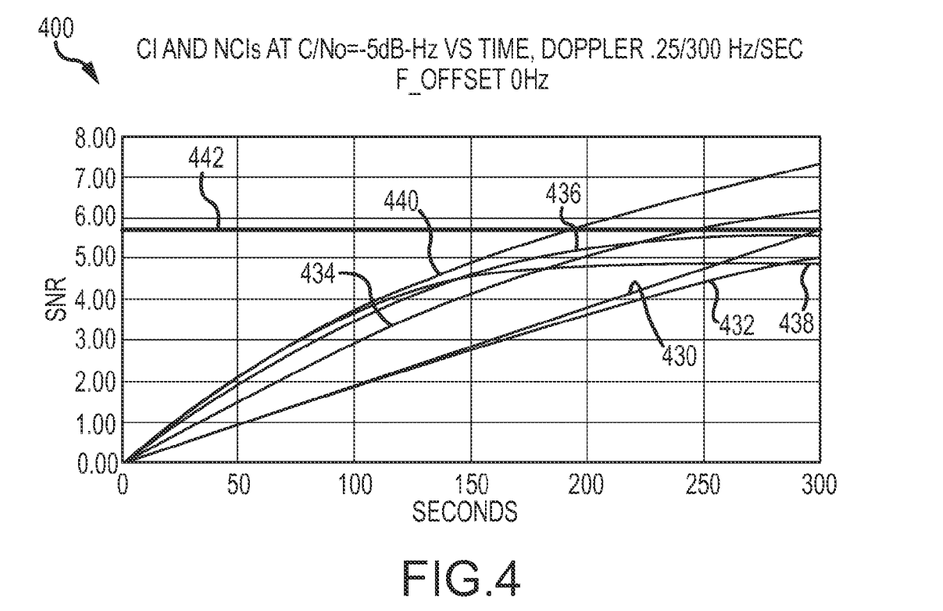
FIGS. 4-5 are plots depicting SNR values for various approaches to coherent integration.

FIG. 4 includes a plot 400 depicting the SNR value on the vertical axis 410 and time on the horizontal axis 420. A number of plot lines each corresponding to resulting SNR values for signals processed using different respective durations of coherent integration time periods are presented. For instance, plot line 430 represents an ideal 1 ms coherent integration where there is no frequency error. Plot line 432 represents the SNR of a signal with a 1 ms coherent integration time period used throughout a non-coherent integration time period including the frequency errors indicated on the top of the chart, plot line 434 represents the SNR of a signal with a 2 ms coherent integration time period used throughout a non-coherent integration time period, plot line 436 represents the SNR of a signal with a 3 ms coherent integration time period used throughout a non-coherent integration time period, plot line 438 represents the SNR of a signal with a 4 ms coherent integration time period used throughout a non-coherent integration time period, and plot line 440 represents the SNR of a signal with a progressively decreased coherent integration time period duration from 4 ms to 1 ms over the course of a non-coherent integration time period. Also, plot line 442 represents a SNR target of 5.7. The conditions related to the plot include coherent and non-coherent integration of an example signal having 0 Hz frequency offset but a frequency error that grows from 0 to 0.25 Hz linearly at 300 seconds.

Figure 5:
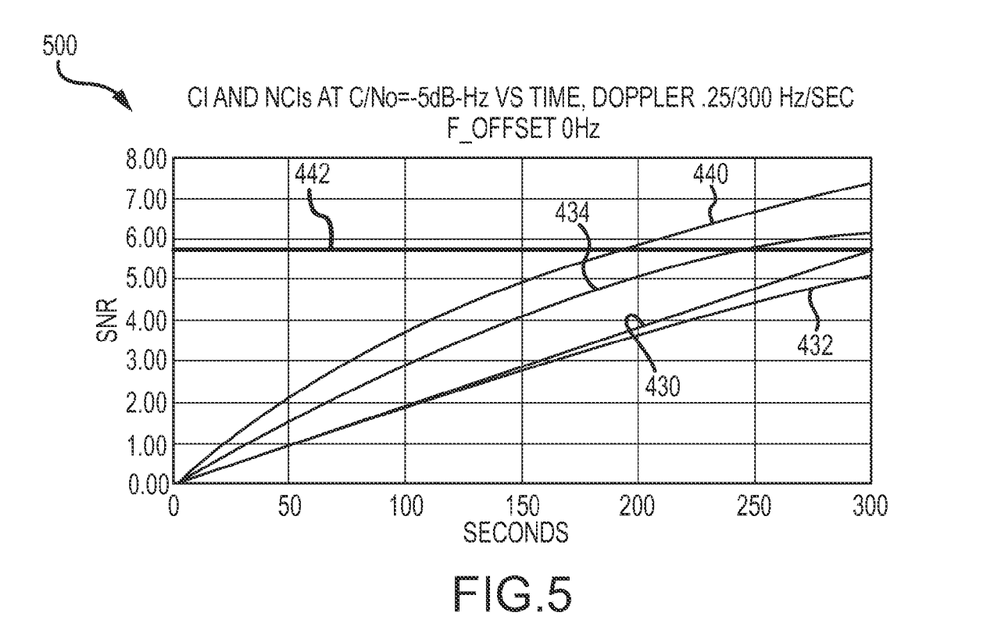

FIG. 5 is provided with plot lines 436 and 438 removed for clarity because the parameters corresponding to these plot lines fail to achieve the target SNR of 5.7 in this particular example. As may be appreciated, the SNR of the resulting signal optimized with a tapered or progressively reduced duration for coherent integration time periods may outperform any one of the SNR values for constant duration coherent integration time periods. Specifically, as may be appreciated, plot line 438 corresponding with a constant 4 ms duration, plot line 436 corresponding with a constant 3 ms duration, and plot line 432 corresponding with a constant 1 ms duration may all fail to achieve the target SNR 442. Furthermore, while plot line 434 corresponding to a constant 2 ms duration does exceed the target SNR 442, the final SNR value for plot 434 is still less than the SNR achieved using the tapered duration associated with plot line 440. Thus, the plot 400 and 500 shown in FIGS. 4 and 5, respectively, demonstrates the benefit of providing progressively reduced durations for coherent integration time periods during a non-coherent integration time period. Namely, increased durations early in the non-coherent integration time period provides improves SNR values when frequency errors are relatively low, while decreased durations later in the non-coherent integration time period when the frequency error has grown further promotes increased SNR values. As can be appreciated from the plots 400 and 500, this reduction in duration thus optimizes the resulting SNR for a given non-coherent integration time period.

In this regard, it may be recognized that the duration determination module 136 may be operative to reduce the duration of a subsequent coherent integration time period within a non-coherent integration time period in a manner that optimizes the SNR of the resulting signal. As such, with returned reference to FIG. 4, the duration of coherent integration time periods may be reduced at a point when the slope of the plot line corresponding to a shortened duration exceeds the slope of the plot line corresponding to the current duration of a coherent integration time period. In this regard, each duration may be utilized for one or more coherent integration time periods until such time as a shorter duration results in an increased rate of SNR gain over the currently used duration, at which time the duration of a subsequent coherent integration time period is shortened to correspond with the shorter duration. This may be repeated until a minimum duration is reached (e.g., corresponding to 1 ms in the example provided). Additionally, as discussed above, the reduction in duration for coherent integration time periods may continue in this regard for subsequent coherent integration time periods in a given non-coherent integration time period. However, the first coherent integration time period in a subsequent non-coherent integration time period may be reset to a maximum duration (e.g., by the duration determination module).

Furthermore, it may be appreciated that the error introduced into the signal at the receiver may result at least in part from an error of the local oscillator 140. As the use of highly precise local oscillators may be cost prohibitive, a less costly, but less precise oscillator may be utilized. Oscillators are often characterized with respect to precision using a statistical measure (e.g., the Allan variance). In any regard, the error of the local oscillator may be statistically described even if a precise offset is not available. That is, in operation, a local oscillator may behave generally in accordance with a statistical measure of precision corresponding to the oscillator. However, a precise error may not be determinable due to variable such as the direction of the offset or the like. As such, a statistical measure of the precision of the oscillator may be known without actual knowledge of the actual error value for the oscillator.

In an embodiment, the duration determination module 136 may utilize information regarding the nature of the error to determine when the duration for a coherent integration time period is to be reduced from a previous period. For example, in the case of a local oscillator with a known statistical measure of the relative precision of the oscillator (e.g., using the Allan variance), the result in the SNR for a given received signal may be modeled. For example, FIGS. 4 and 5 may represent examples of such modeled SNR performance for various durations of coherent integration time periods. As such, the model of the SNR performance with respect to the duration of coherent integration time periods may be utilized to pre-configure when the duration of a coherent integration time period may be reduced. For instance, for a given local oscillator 140, a statistical measure of frequency drift may be utilized to determine when the resulting error results in a shorter duration coherent integration time improving the SNR for an integrated signal. That is, the statistical measure of the performance of the oscillator 140 may be used to improve the SNR even if the exact measure of the error (e.g., magnitude and direction of the frequency instability) is not known or determinable.

Also, while the foregoing discussion contemplates a stepwise reduction in duration for subsequent coherent integration time periods (e.g., from a set duration of 4 ms to 3 ms to 2 ms to 1 ms), it may be appreciated that the reduction in duration may be continuous without discrete values for duration. For instance, analysis may be performed to determine an optimal duration in view of the amount of error introduced into the signal. Furthermore, while the foregoing contemplates the setting of the durations (e.g., setting an initial duration and subsequently modifying the duration) as being performed locally at the receiver 120, it may be appreciated that these determinations may be performed remotely from the receiver 120. In this regard, the receiver 120 may be in operative communication with another device (e.g., over a network such as a wide area network like the internet). In turn, the receiver 120 may send and/or receive information related to determining and/or setting a duration for coherent integration time periods.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for improved performance of a receiver used in conjunction with a positioning system, the method comprising:

setting, at a duration determination module, a first duration for a first coherent integration time period for coherent integration of signals received from the positioning system at the receiver during the first coherent integration time period;

modifying, with the duration determination module, the first duration of the coherent integration time period to a second duration for a second coherent integration time period for coherent integration of signals received from the positioning system at the receiver during the second coherent integration time period, wherein the modifying is in response to errors in the signals introduced at the receiver, and wherein the second duration is less than the first duration;

generating a first coherent integration value from coherent integration of signals received from the positioning system at the receiver during the first coherent integration time period and a second coherent integration value from coherent integration of signals received from the positioning system at the receiver during the second coherent integration time period, wherein each respective coherent integration value is based on the magnitude of the integrated signals in each corresponding coherent integration time period; and non-coherently summing the first and second coherent integration values.

2. The method according to claim 1, wherein the modifying occurs when use of the second duration results in an improved signal to noise ratio for integrated signals in the second coherent integration time period as compared to a signal to noise ratio for integrated signals in the first coherent integration time period using the first duration.

3. The method according to claim 2, wherein the modification is determined at least partially based on a local oscillator error.

4. The method according to claim 1, wherein the modifying is at least partially based on a statistically derived characterization of the error at the receiver.

5. The method according to claim 4, wherein an exact error is unknown.

6. The method according to claim 4, wherein the statistically derived characterization of the error corresponds with a local oscillator error.

7. The method according to claim 1, wherein the modifying comprises a step-wise reduction in the first duration to the second duration.

8. The method according to claim 1, wherein the modifying comprises a continuous reduction in the first duration to the second duration over time.

9. The method according to claim 1, wherein the modifying is repeated to reduce a previous duration of a previous coherent integration time period to a reduced duration for a subsequent coherent integration time period for coherent integration of signals received from the positioning system at the receiver during the subsequent coherent integration time period, wherein the modifying is in response to errors in the signals introduced at the receiver, and wherein the reduced duration is less than the previous duration.

10. The method according to claim 1, further comprising repeating the modifying until the reduced duration is at a predefined minimum duration.

11. The method according to claim 1, wherein each respective coherent integration value corresponds to the squared magnitude of the integrated signals in each corresponding coherent integration time period.

12. The method according to claim 1, wherein each coherent integration time period for which a corresponding coherent integration value is non-coherently summed collectively define a non-coherent integration time period.

13. The method according to claim 12, further comprising:

resetting a duration for a coherent integration time period in a subsequent non-coherent integration time period to the first duration;

wherein the first duration corresponds to a maximum predefined coherent integration time.

14. The method according to claim 1, wherein the setting and modifying are performed locally at the receiver at which the signals are received.

15. The method according to claim 1, wherein the setting and modifying are performed remotely from the receiver at which the signals are received.

16. A receiver for use in conjunction with a positioning system, the receiver comprising:

a receiver module operable to receive signals from the positioning system;

a coherent integration module in operative communication with the receiver module for coherent integration of the signals received by the receiver module, wherein the coherent integration module is operable to perform coherent integration of the signals received from the receiver module during a corresponding coherent integration time period defined by a duration to generate a coherent integration value for each corresponding coherent integration time period; and a duration determination module in operative communication with the coherent integration module that is operable to establish the duration of a given coherent integration time period at least partially based on errors in the signal introduced at the receiver and reduce a previous duration of a previous coherent integration time period to a reduced duration for a subsequent coherent integration time period at least partially in response to an error value corresponding to the local oscillator of the receiver, wherein the reduced duration results in an improved signal to noise ratio as compared to the signal to noise ratio for the previous duration.

17. The receiver according to claim 16, wherein the duration determination module is operable to establish the duration at least partially based on a statistically derived characterization of the local oscillator error.

18. The receiver according to claim 17, wherein an exact local oscillator error is unknown.

19. The receiver according to claim 16, wherein the positioning system comprises a global navigation satellite system.

* * * * *